United States Patent [19]
Paredes et al.

[11] Patent Number: 5,101,936
[45] Date of Patent: Apr. 7, 1992

[54] VACCUM OPERATED DRY SUMP SYSTEM

[75] Inventors: Andrew Paredes, Northville; Robert C. Roethler, Howell, both of Mich.

[73] Assignee: Ford Motor Company, Dearborn, Mich.

[21] Appl. No.: 630,575

[22] Filed: Dec. 20, 1990

[51] Int. Cl.⁵ .................................... F01M 11/06
[52] U.S. Cl. ................... 184/6.13; 184/6.4; 184/103.1; 123/196 S
[58] Field of Search ............ 184/6.13, 7.4, 6.4, 184/108, 103.1, 103.2; 137/113; 123/196 S, 196 R; 141/95, 192, 198, 217, 227

[56] References Cited

U.S. PATENT DOCUMENTS

| | | | |
|---|---|---|---|
| 1,346,898 | 7/1920 | Kingsbury | 184/103.1 |
| 1,370,641 | 3/1921 | Grant | 184/6.4 |
| 4,168,638 | 9/1979 | Usui | 74/863 |
| 4,226,267 | 10/1980 | Meacham, Jr. | 141/198 |
| 4,599,979 | 7/1986 | Breckenfeld et al. | 123/73 AD |
| 4,681,189 | 7/1987 | Krisiloff | 184/6.13 |
| 4,697,553 | 10/1987 | Lie | 123/73 AD |
| 4,720,024 | 1/1988 | Jongerius | 141/198 |
| 4,750,456 | 8/1988 | Ladrach | 123/196 S |
| 4,762,201 | 8/1988 | Malik | 184/6.13 |
| 5,005,615 | 4/1991 | McGarvey et al. | 141/198 |

Primary Examiner—Ira S. Lazarus
Assistant Examiner—Alan B. Cariaso
Attorney, Agent, or Firm—Frank G. McKenzie; Keith L. Zerschling

[57] ABSTRACT

A scavenging system for a hydraulic circuit includes a sump passage connecting the sump to a reservoir, a solenoid-operated switching valve, a logic control circuit controlling operation of the switching valve and a passage connecting the reservoir to the inlet of a hydraulic pump that supplies the hydraulic circuit. A vacuum source, such as the intake manifold of an internal combustion engine or a vacuum pump, is connected through a ball check valve and vacuum regulator to a space in the reservoir above the fluid. Fluid level sensing switches sense the level of fliud within the reservoir and produce electronic signals used by the logic circuit to control the solenoid-operated switching valve. An oil filter cap allows the reservoir to be filled while maintaining vacuum within the reservoir. A heat exchanger located within the reservoir draws excess heat from the fluid by passing engine coolant through the exchanger. A float valve located within the sump closes the connection between the sump and the reservoir when fluid level within the sump is low and opens that connection when fluid level in the sump is high.

18 Claims, 3 Drawing Sheets

Q HIGH SOLENOID "ON"
Q LOW  SOLENOID "OFF"

VACCUM OPERATED DRY SUMP SYSTEM

BACKGROUND OF THE INVENTION

1. Field of the Invention

This invention relates to the field of hydraulic systems. More particularly, it pertains to the source of supply of hydraulic fluid to the inlet of a hydraulic pump. The system is especially adapted for use in an automatic transmission for automotive vehicles having a low volume sump and a higher volume reservoir.

2. Description of the Prior Art

Automatic transmissions, particularly those used in front wheel drive vehicles, are susceptible to oil pump cavitation. This condition is caused when transmission fluid in the sump that collects hydraulic fluid from the control circuit of the transmission is thrown by centrifugal force away from the pump inlet in the sump when the car turns at high speed.

Various attempts have been made to overcome this difficulty. The scavenging system described in U.S. Pat. No. 4,762,201 uses a substantially dry sump from which hydraulic fluid is taken to fill a reservoir by means of a vacuum. Hydraulic fluid required by the transmission is directly pumped from the reservoir. The system provides no means to switch the pump inlet connection between the reservoir fluid and sump fluid in response to various operating conditions of the system.

U.S. Pat. No. 4,168,638 describes a fluid pressure supply system for a hydraulic control system of an automatic transmission. This system uses engine intake manifold as a vacuum source to supply hydraulic fluid to a reservoir from which fluid is supplied to produce gear shifting. The system includes a high pressure cutoff valve and an additional cutoff valve between the vacuum source and the supply source, which valves respond to engine operating conditions and movement of the gearshift mechanism of the transmission.

U.S. Pat. Nos. 4,599,979; 4,697,553; and 4,750,456 describe lubrication systems that use intake manifold vacuum to draw lubrication fluid from a reservoir or sump to lubricate an internal combustion engine. U.S. Pat. No. 4,681,189 describes a dry sump lubrication system for an internal combustion engine. That system is particularly directed to separating air from the pump oil in a dry sump system.

SUMMARY OF THE INVENTION

A conventional fluid sump in an automatic transmission permits the pump inlet to become uncovered by fluid within the sump when the vehicle is cornering or moving on a highly inclined grade. A conventional lubricating oil sump contains substantial volume of lubricating oil through which rotating components of the transmission pass as they operate at high speed within the transmission. Consequently, parasitic oil stirring losses result because of the drag effect on the rotating components that the transmission oil causes, particularly at low temperature when oil viscosity is high.

These difficulties are overcome with the scavenging system of the present invention. In addition, an automatic transmission that includes the system of this invention requires a smaller space and a smaller volume than a conventional sump and raises the vehicle ground clearance because the volume of fluid normally contained within the sump below the transmission is located instead in a reservoir that could be located in a more favorable position. The system of the present invention reduces cost, complexity and power losses and improves reliability in comparison to conventional mechanical pump dry sump systems.

The scavenging system of this invention includes a sump passage connecting the sump to a reservoir, a solenoid-operated switching valve, a logic control circuit for controlling operation of the switching valve and a passage connecting the reservoir to the inlet of a hydraulic pump that supplies the hydraulic circuit. A vacuum source, such as the intake manifold of an internal combustion engine or a vacuum pump, is connected through a ball check valve and vacuum regulator to a space in the reservoir above the volume of fluid. Fluid level sensing switches sense the level of fluid within the reservoir and produce an electronic signal used by a logic circuit to control the solenoid-operated switching valve. An oil filter cap allows the reservoir to be filled while maintaining vacuum within the reservoir. A heat exchanger located within the reservoir draws excess heat from the fluid by passing engine coolant through the exchanger. A float valve located within the sump closes communication between the sump and reservoir when the fluid level within the sump is low and opens that connection when fluid level in the sump is high.

DESCRIPTION OF THE PREFERRED EMBODIMENT

Figure 1:
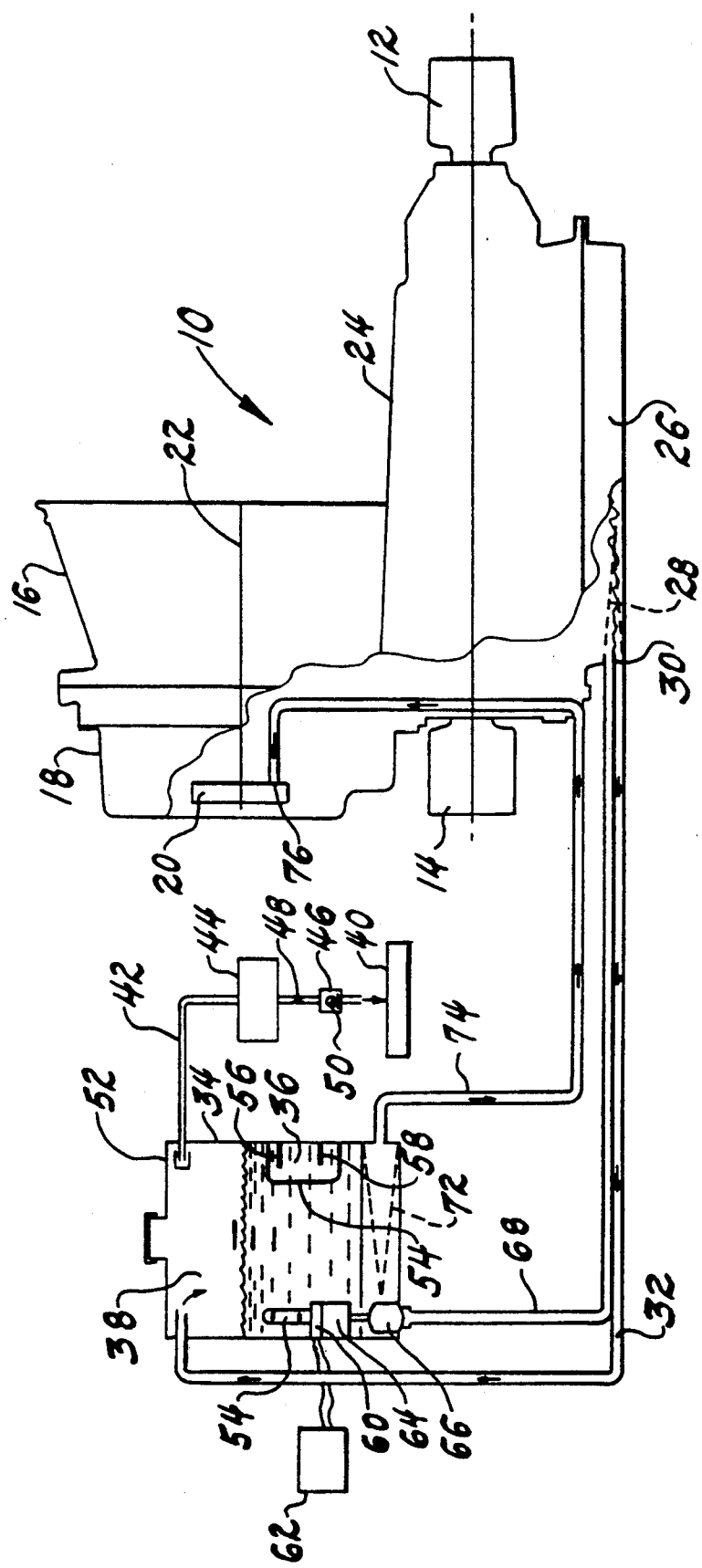
FIG. 1 is a schematic diagram of a dry sump system operating in combination with an automatic transmission, wherein hydraulic fluid flows between the transmission sump, a reservoir and a pump inlet.

Referring first to FIG. 1, a transmission, suited to be driven by a transversely disposed engine within a motor vehicle, drives output shafts 12 and 14 connected to the drive wheels. The transmission 22 includes a casing 16 connected to the engine and containing a torque converter and a second casing 18 bolted to casing 16 and containing, among other components, a hydraulic pump 20, whose shaft is concentric with the input shaft of the transmission. A lower transmission housing 24 contains planetary gear sets, clutches, brakes and servos that operate to control the gearing and to selectively produce multiple gear ratios. Attached to the lower surface of housing 24 is an oil pan or sump 26 for collecting hydraulic fluid which circulates in the hydraulic circuit at various magnitudes of pressure, is supplied to the clutches and brakes and various elements of the gear sets, and recirculates to the pump through the system of this invention. The pump may be of a conventional gear pump design, or it may be a variable displacement pump. Sump 26 generally includes a screen located adjacent the sump outlet 30 to filter debris, such as entrained metallic particles, dirt, etc., and to prevent their return to the pump An oil line 32 connects outlet 30 to a oil storage reservoir 34 containing a sealed volume partially occupied with hydraulic transmission fluid 36 and an evacuated space 38 above the fluid.

A vacuum source, such as the intake manifold of an internal combustion engine or a vacuum pump 40, is connected by a passage 42 to space 38 through a vacuum regulator 44, a check valve 46 and an orifice 48. A suitable vacuum regulator is available commercially as Model Number A-31VR, a pressure regulator and reduction valve sold under the Cash-Acme brand by A. W. Cash Valve Manufacturing Company of Decatur, Ill. The vacuum regulator, preferably of the non-venting design, maintains vacuum level in the reservoir within a range sufficient to draw oil from the sump but not so large a vacuum as to cause the transmission hydraulic fluid pump to cavitate. The check valve is provided to maintain vacuum in the reservoir in the event the vacuum source becomes unavailable, as when the engine manifold vacuum is temporarily reduced during wide open throttle operation. If the vacuum source is lost, the ball 50 of check valve 46 becomes seated at the end of passage 42 to seal space 38 within the reservoir. Orifice 48 limits the rate of air flow from the reservoir to the vacuum source to an acceptable flow rate. An oil separator 52 is located in vacuum passage 42 to prevent transmission fluid from being drawn into the vacuum source.

A fluid level sensor 54, such as the ALS-7990 Series sold by Gems Division of IMO Industries of Plainville, Conn., is located in the reservoir below the normal level of the fluid there. The fluid level sensor includes fluid level switches 56, 58, spaced mutually apart an appropriate distance in the direction of the depth of the fluid within the reservoir. These switches are connected to a logic circuit 60 connected to an electrical power source such as a battery 62. Solenoid 64 is energized and deenergized in accordance with logic inherent in the circuit to move hydraulic switching valve 66 between various states.

The transmission sump 26 is connected through conduit 68 to switching valve 66. Fluid within the reservoir enters the switching valve through inlet port 70. The reservoir includes an oil filter 72 through which all of the transmission fluid passes as it leaves the reservoir and enters passage 74, through which the reservoir is connected to the inlet 76 of pump 20.

Figure 2:
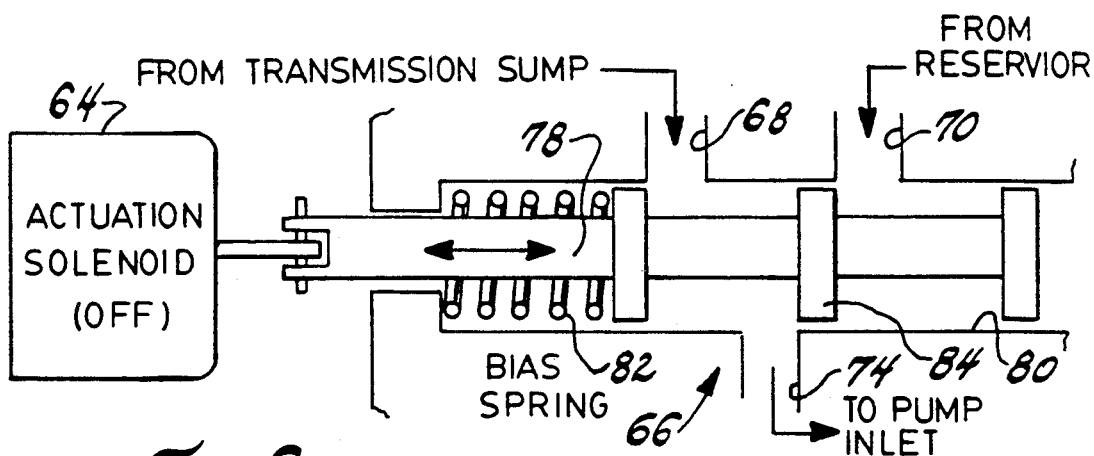
FIG. 2 shows a solenoid-operated switching valve located adjacent the pump inlet in the system of FIG. 1.

FIG. 2 shows in greater detail the switching valve 66 and a solenoid 64 that controls the position of a valve spool 78, which moves within a valve cylinder 80 and is biased by a compression spring 82. When spool 78 is located in the position shown in FIG. 2, a first land 84 integral with the spool closes communication between the reservoir inlet 70 and the pump conduit 74 and opens communication between the sump passage 68 and pump inlet 76 through passage 74. When the solenoid is energized, spring 82 is compressed and spool 78 moves leftward. In that position, land 84 opens reservoir passage 70 to pump inlet passage 74 and closes sump passage 68 to the pump inlet.

Figure 3:
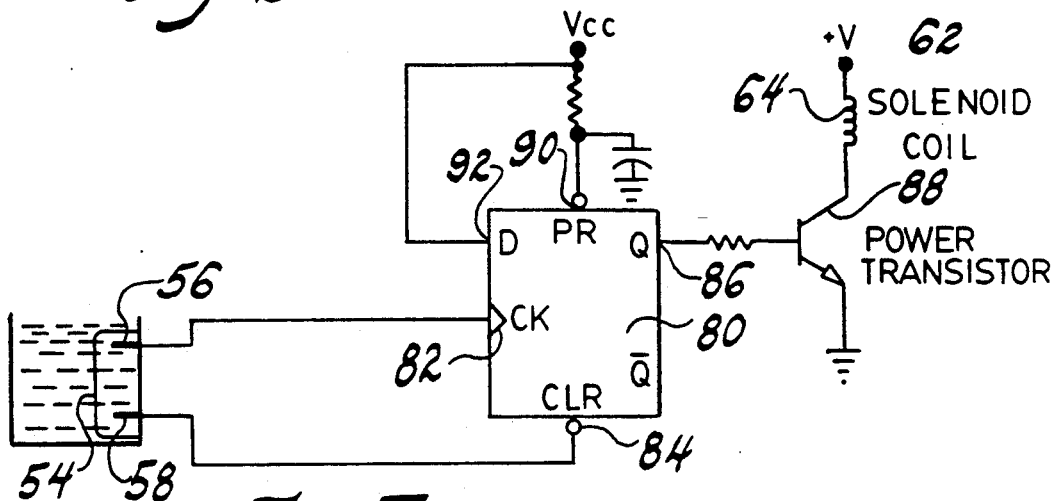
FIG. 3 shows a control circuit used to energized and deenergize a solenoid that operates the switching valve.
Figure 4:
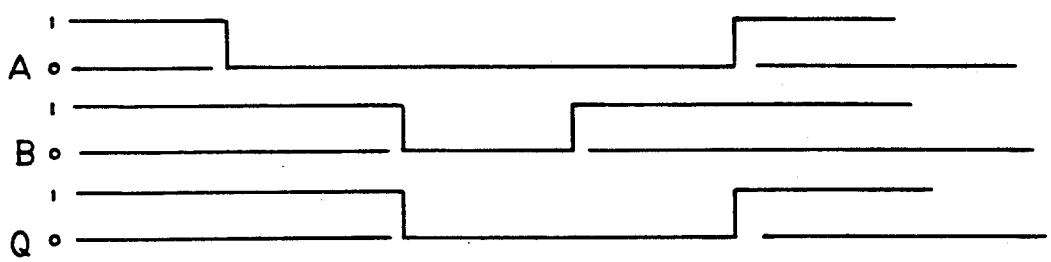
FIG. 4 shows the change of state with time at various nodes of the control circuit of FIG. 3.

Turning now to FIGS. 3 and 4, D flip-flop 80 has its clock pin 82 connected by an electrical connector to a fluid level switch 56 and its clear or reset pin 84 connected to a fluid level switch 58. The Q output pin 86 is connected through a 10K resistor to the base of a power transistor 88, such as transistor TIP 121 sold by Texas Instruments. Voltage from power supply 60 is connected to one end of the coil of solenoid 64, and the other end of the coil is connected to the collector of npn power transistor 88. The emitter of the transistor is grounded. A control voltage $V_{cc}$, which can be approximately 5 volts if transistor-transistor logic is used or 12 volts if CMOS technology is used in the logic circuit, is connected through a 5K resistor to the preset pin 90 and directly to pin 92. A capacitor of approximately 0.1 $\mu f$ and the 5K resistor operate to delay the application of the $V_{cc}$ voltage to the preset pin until the states of the other pins of the D flip-flop have attained settled, stable values. This assures that when the preset terminal is low, the Q output is high.

The fluid level switches 56 and 58 are closed when covered by hydraulic fluid in the reservoir and opened when the fluid level is low enough to uncover the switches. The D flip-flop is triggered by a positive rising edge and has active, low preset and clear. When the clear pin is low, the Q output is low. The state of the clear and preset pins have priority over the states of the other pins.

Referring now to the timing diagram of FIG. 4, the logic circuit latches output Q to the state of input D when a rising edge is present at the clock pin. The state of the preset and clear pins preempts the input and clock functions while the preset pin is low, thereby producing high Q output. When the clear pin is low, the Q output is low. When the Q output is high, power transistor 88 conducts, solenoid 64 is energized, and switching valve 66 opens the fluid contents of the reservoir to the pump inlet. When Q output is low, the power transistor is nonconducting, the solenoid is deenergized, and the switching valve opens transmission sump 26 through passage 60 to the pump inlet through passage 74. In terms of the level of fluid within the reservoir, the contents of the reservoir are connected to the pump when a rising edge appears at the clock pin, and this connection is maintained until the state of switches 56, 58 goes low. When that occurs, the sump is connected directly to the pump inlet through the switching valve and continues in that state until switch 56 is again closed by fluid rising within the reservoir, regardless of the level of the fluid at the location of switch 58.

During normal operation, the oil level in the reservoir is above the high limit switch 56 and the solenoid moves the switching valve to a position that causes the pump inlet to draw oil from the reservoir. If the oil level in the reservoir drops below low limit switch 58, solenoid 64 is deenergized and switching valve 66 opens the pump inlet to the transmission sump. Thereafter, the solenoid is not turned on again until the oil level in the reservoir rises above switch 56. This feature provides hysteresis and prevents undue cycling of the switching valve.

Figure 5:
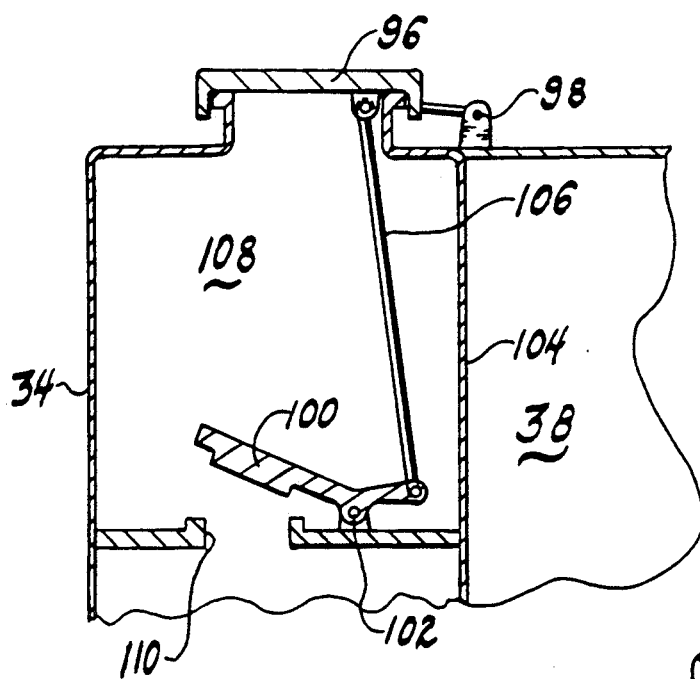
FIG. 5 is a view showing the detail of a filler cap arrangement for filling the reservoir and maintaining vacuum.

In FIG. 5, an outer filler cap 96 is shown pivotably supported at 98 on the outer wall of reservoir 34. When the outer cap is closed, it seals the reservoir against passage of air. An inner cap 100 is pivotally mounted at 102 on an inner wall 104 of the reservoir on the opposite side of the pivot 102. The inner cap is connected by a link 106 to the outer cap. When the outer cap is closed, the inner cap is opened; when the outer cap is opened, the inner cap is closed. In this way, vacuum present within space 38, the volume of the reservoir above the oil level, is sealed by the inner cap when the outer cap is opened to add hydraulic fluid to the reservoir. When the outer cap is closed after filling reservoir compartment 108, the inner cap is opened and fluid within that compartment flows through opening 110 to the interior of the reservoir.

Figure 6:
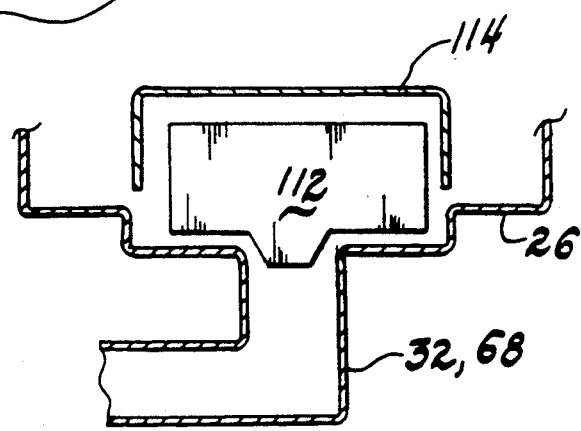
FIG. 6 is a detail of a float check valve located in the transmission sump adjacent the sump drain tube.

FIG. 6 shows a float check valve 112 located at the bottom of the transmission sump 26, fixed in place by a retainer that allows communication between the interior of the retainer and the sump. When the level of hydraulic fluid in the sump is high, the float rises within the retainer to the extent permitted and the drain tube 32 or 68 is opened. When the level of hydraulic fluid in the sump is low, the float falls within the retainer, seals the lower surface of the sump and closes communication with the sump through the drain tube. This action prevents air from being drawn into the reservoir by the vacuum source when oil level within the sump is low.

Figure 7:
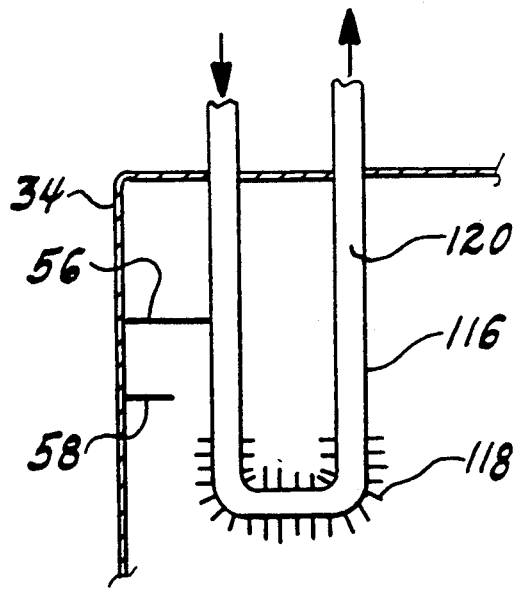
FIG. 7 shows a heat exchanger located within the reservoir.

FIG. 7 shows a heat exchanger 116, in the form of a tube 120 having fins 118 extending outward from the tube, located within the reservoir. Engine coolant is directed from the radiator through tube 120 and is returned to the engine cooling system. The heat exchanger absorbs heat from the relatively high temperature transmission fluid returning from the hydraulic control circuit and lubrication circuit of the transmission. When an oil cooler of this type is used, the transmission oil cooler conventionally present within the radiator is unnecessary.

This system maintains transmission fluid in the reservoir and draws fluid out of the sump at an average rate equal to or in excessive of the flow rate of fluid into the sump from internal leakage, lubrication, and hydraulic control of transmission operation. In certain transient conditions, such as when releasing a clutch servo, the flow rate into the sump may temporarily exceed the fluid flow rate into the reservoir. This condition is acceptable because sufficient reserve volume is provided in the reservoir.

Having described the preferred embodiment of our invention, what we claim and desire to secure by U.S. Letters Patent is:

1. A system for supplying hydraulic fluid to the inlet of a pump, comprising:
    a sump adapted to receive and contain fluid;
    a reservoir adapted to contain hydraulic fluid having a volume located above fluid in the reservoir;
    a vacuum source communicating with the volume of said reservoir above the fluid therein;
    means hydraulically connecting the sump and the reservoir;
    fluid level sensor means for indicating the level of fluid in the reservoir;
    switching valve means responsive to the indicated fluid level in the reservoir for connecting the fluid in the reservoir to the pump if the fluid level in the reservoir is high and for connecting the sump to the pump if the fluid level in the reservoir is low.

2. The system of claim 1 wherein the switching valve means connects the reservoir to the pump if the fluid level in the reservoir is at least equal to a maximum reference level and connects the sump to the pump if the fluid level in the reservoir is below a minimum reference level.

3. The system of claim 1 wherein the switching valve means connects the reservoir to the pump if the fluid level in the reservoir is at least equal to a maximum level and connects the sump to the pump if the fluid level in the reservoir is at least equal to a minimum reference level and below said maximum reference level.

4. The system of claim 1 wherein the vacuum source further includes:
    vacuum regulator means for maintaining a minimum vacuum in the reservoir sufficient to draw fluid from the sump into the reservoir;
    first check valve means to prevent flow of gaseous fluid from the vacuum pressure source to the reservoir; and
    orifice means for limiting the flow rate from the reservoir to the vacuum source.

5. The system of claim 1 wherein the vacuum source further includes:
    an engine intake manifold;
    vacuum regulator means located between the intake manifold and the reservoir for maintaining a minimum vacuum in the reservoir sufficient to draw fluid from the sump into the reservoir;
    first check valve means to prevent flow of gaseous fluid from the vacuum pressure source to the reservoir; and
    orifice means for limiting the flow rate from the reservoir to the vacuum source.

6. The system of claim 1 further including first filter means located between the switching valve means and the pump for filtering contaminants from the fluid.

7. The system of claim 1 further comprising heat exchanger means located in the reservoir for transferring heat between the fluid in the reservoir and engine coolant flowing through the heat exchanger.

8. The system of claim 1 further comprising cap means carried on the reservoir for filling the reservoir with hydraulic fluid and maintaining vacuum in the reservoir while filling the reservoir.

9. The system of claim 1 further comprising check valve means for preventing flow of gaseous fluid from the sump to the reservoir.

10. A system for supplying hydraulic fluid to the inlet of a pump, comprising:
    a sump adapted to receive and contain fluid;
    a reservoir adapted to contain hydraulic fluid having a volume located above fluid in the reservoir;
    a vacuum source communicating with the volume of said reservoir above the fluid therein;
    means hydraulically connecting the sump and the reservoir;
    an electrical power source;
    first and second fluid level sensor switches connected to the electrical power source for producing signals representing the level of fluid in the reservoir in accordance with the state of said switches;
    a solenoid;
    a hydraulic switching valve having inlet ports connected to the sump and reservoir, an outlet port connected to the pump, a valve spool moved by the solenoid between a first state where the reservoir is connected to the pump and the sump is disconnected from the pump and a second state where the sump is connected to the pump and the reservoir is disconnected from the pump;
    switching means for changing the conductive state of the solenoid through the electrical power source;
    logic circuit means driving the switching means, responsive to the state of the fluid level switches for connecting fluid in the reservoir to the pump if the fluid level in the reservoir is high and for connecting the sump to the pump if the fluid level in the reservoir is low.

11. The system of claim 10 wherein the switching valve means connects the reservoir to the pump if the fluid level in the reservoir is at least equal to a maximum reference level and connects the sump to the pump if the fluid level in the reservoir is below a minimum reference level.

12. The system of claim 10 wherein the switching valve means connects the reservoir to the pump if the fluid level in the reservoir is at least equal to a maximum reference level and connects the sump to the pump if the fluid level in the reservoir is at least equal to a minimum reference level and below said maximum reference level.

13. The system of claim 10 wherein the logic circuit means includes:
   a D flip-flop having a clock pin connected to the first fluid level sensor switch, a clear pin connected to the second fluid level sensor switch, a D pin connected to a reference voltage, and an output connected to the base of the power transistor.

14. A system for supplying hydraulic fluid to the inlet of a pump, comprising:
   a sump adapted to receive and contain fluid;
   a reservoir adapted to contain hydraulic fluid having a volume located above fluid in the reservoir;
   a vacuum source communicating with the volume of said reservoir above the fluid therein;
   means hydraulically connecting the sump and the reservoir;
   fluid level sensor means for indicating the level of fluid in the reservoir;
   switching valve means responsive to the indicated fluid level in the reservoir for connecting the fluid in the reservoir to the pump if the fluid level in the reservoir is high and for connecting the sump to the pump if the fluid level in the reservoir is low;
   an engine intake manifold;
   vacuum regulator means located between the intake manifold and the reservoir for maintaining a minimum vacuum in the reservoir sufficient to draw fluid from the sump into the reservoir;
   first check valve means to prevent flow of gaseous fluid from the vacuum pressure source to the reservoir; and
   orifice means for limiting the flow rate from the reservoir to the vacuum source;
   filter means located between the switching valve means and the pump for filtering contaminants from the fluid;
   heat exchanger means located in the reservoir for transferring heat between the fluid in the reservoir and engine coolant flowing through the heat exchanger.

15. The system of claim 14 further comprising cap means carried on the reservoir for filling the reservoir with hydraulic fluid and maintaining vacuum in the reservoir while filling the reservoir.

16. The system of claim 14 further comprising check valve means for preventing flow of gaseous fluid from the sump to the reservoir.

17. The system of claim 14 wherein the switching valve means connects the reservoir to the pump if the fluid level in the reservoir is at least equal to a maximum reference level and connects the sump to the pump if the fluid level in the reservoir is below a minimum reference level.

18. The system of claim 14 wherein the switching valve means connects the reservoir to the pump if the fluid level in the reservoir is at least equal to a maximum reference level and connects the sump to the pump if the fluid level in the reservoir is at least equal to a minimum reference level and below said maximum reference level.

* * * * *

UNITED STATES PATENT AND TRADEMARK OFFICE
CERTIFICATE OF CORRECTION

PATENT NO.  : 5,101,936
DATED       : April 7, 1992
INVENTOR(S) : Paredes et al

It is certified that error appears in the above-identified patent and that said Letters Patent is hereby corrected as shown below:

Title page, Item[54] and Col. 1, line 1, delete "VACCUM" and insert in place thereof -- VACUUM --.

Signed and Sealed this

First Day of June, 1993

Attest:

MICHAEL K. KIRK

Attesting Officer

Acting Commissioner of Patents and Trademarks